(12) United States Patent
Brichzin et al.

(10) Patent No.: US 8,727,236 B2
(45) Date of Patent: May 20, 2014

(54) ELECTRICALLY HEATED SPRAY NOZZLE

(75) Inventors: Volker Brichzin, Ludwigsburg (DE); Nicolaus Wulff, Ludwigsburg (DE); Lutz Frassek, Roedental (DE); Martin Eller, Ludwigsburg (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 37 days.

(21) Appl. No.: 12/902,641

(22) Filed: Oct. 12, 2010

(65) Prior Publication Data

US 2011/0089257 A1 Apr. 21, 2011

(30) Foreign Application Priority Data

Oct. 15, 2009 (DE) .................... 10 2009 050 288

(51) Int. Cl.
*F23Q 7/22* (2006.01)
*F23Q 7/00* (2006.01)
*B05B 1/24* (2006.01)

(52) U.S. Cl.
USPC ......... 239/135; 239/139; 123/145 A; 219/270

(58) Field of Classification Search
USPC ................ 239/135, 139; 123/145 A; 219/270
See application file for complete search history.

(56) References Cited

U.S. PATENT DOCUMENTS

| | | | | |
|---|---|---|---|---|
| 4,382,448 A | * | 5/1983 | Tittert | 132/232 |
| 5,117,482 A | * | 5/1992 | Hauber | 392/492 |
| 6,392,199 B1 | * | 5/2002 | Endler et al. | 219/270 |
| 6,396,028 B1 | * | 5/2002 | Radmacher | 219/270 |
| 6,610,964 B2 | * | 8/2003 | Radmacher | 219/270 |
| 2007/0051096 A1 | * | 3/2007 | Pfeifer et al. | 60/286 |

FOREIGN PATENT DOCUMENTS

| | | | |
|---|---|---|---|
| DE | 35 16 410 A1 | | 11/1986 |
| DE | 3516410 A1 | * | 11/1986 |
| DE | 36 13 748 A1 | | 10/1987 |
| DE | 37 16 411 A1 | | 12/1988 |

\* cited by examiner

*Primary Examiner* — Ryan Reis
(74) *Attorney, Agent, or Firm* — Hackler Daghighian & Martino

(57) ABSTRACT

An electrically heated spray nozzle comprising a ceramic pin is described, the ceramic pin comprises a flow channel having at least one opening for a fluid to be atomized, wherein the ceramic pin includes a ceramic inner conductor and a ceramic outer conductor, between which a ceramic insulator is disposed.

14 Claims, 2 Drawing Sheets

ELECTRICALLY HEATED SPRAY NOZZLE

The invention relates to an electrically heated spray nozzle. Spray nozzles of this type are used e.g. to vaporize fuel and inject it into a combustion chamber. Spray nozzles of this type are often referred to as fuel vaporizer plugs and are described e.g. in DE 37 16 411 C2 and DE 35 16 410 A1. Electrically heated spray nozzles are required in motor vehicles, in particular as injection nozzles for media such as fuel, urea solution, or water.

The object of the present invention is to demonstrate a way to cost-effectively create a spray nozzle that is suitable for use in motor vehicles.

SUMMARY OF THE INVENTION

A ceramic pin that comprises a ceramic inner conductor and a ceramic outer conductor, between which a ceramic insulator is disposed, is used for a spray nozzle according to the invention. A flow channel having at least one opening for a fluid to be atomized extends in this ceramic pin.

A ceramic pin of this type can be manufactured by the coextrusion of suitable ceramic materials e.g. on the basis of silicon nitride or another electrically conductive ceramic material. By admixing an electrically conductive ceramic material e.g. molybdenum silicide or tungsten silicide, electrical conductance can be adjusted for the inner conductor and the outer conductor. In a pin of this type, a flow channel can be easily realized as a bore extending in the longitudinal direction. Any number of openings can be created by using transverse bores. The bore that extends in the longitudinal direction can extend from one end to the other end, and therefore the pin has an opening at its tip. It is also possible for the bore that extends in the longitudinal direction to terminate shortly before the tip, and therefore openings are created by using only one or more additional bores, in particular transverse bores. The additional bores preferably have a smaller diameter than the bore that extends in the longitudinal direction to form the flow channel.

While conventional spray nozzles must be composed of a larger number of individual parts, which is a more or less elaborate process, a spray nozzle according to the invention can be advantageously produced as a single piece and therefore in a cost-effective manner. It is also advantageous, in particular, that a cylindrical ceramic pin can be easily connected to a liquid line in a leak-proof manner.

In the case of a spray nozzle according to the invention, an end section of the outer conductor is preferably designed as a ceramic heating conductor. In this manner, the heating energy can be concentrated on an end section of the ceramic pin, in which the opening or openings is/are preferably disposed. Basically, it is also possible, however, to heat the ceramic pin evenly along its entire length using a current that flows through the inner conductor and the outer conductor. To design an end section of the outer conductor as a ceramic heating conductor, in the case of an extruded green body, the outer conductor can be removed from an end section of the pin, and a heating conductor material can be subsequently applied there e.g. via spraying.

According to an advantageous refinement of the invention, the flow channel and/or the at least one opening are covered by a coating on their inner surfaces. A coating of this type can inhibit deposits of liquid residues. This is an important advantage in particular when the spray nozzle is used as a fuel atomizer since fuel atomizers are often damaged by coking. A coating can also be used advantageously if there is a chemical incompatibility between the fluid to be atomized and the material of the glow element. Urea solution, for instance, which is highly corrosive, is used in motor vehicles for exhaust gas purification catalysts.

The coating preferably contains noble metal. In this manner, a burn-off of soot can be advantageously catalyzed. The coating can be e.g. a layer based on silicon oxide, which contains rare earths and is doped with noble metal. A metal film or a silicone resin, for instance, can also be used as the coating. Silicone resins can be applied as a varnish or powder coating, and withstand temperatures of several 100° C. Silicone resin coatings based on phenyl siloxane in particular have very good temperature resistance. To protect the spray nozzle against deposits of liquid residues, it is advantageous to provide a coating in the region of the openings in particular since this is where the temperature of the liquid is highest. In the case of a spray nozzle according to the invention, the outer conductor is therefore preferably covered by a coating in the at least one opening. In addition, the outer side of the glow element can be covered by a coating of this type.

BRIEF DESCRIPTION OF THE DRAWINGS

Further details and advantages of the invention are explained using embodiments, with reference to the attached drawings. Components that are identical or similar are labelled using the same reference numerals. In the figures.

DETAILED DESCRIPTION

Figure 1:
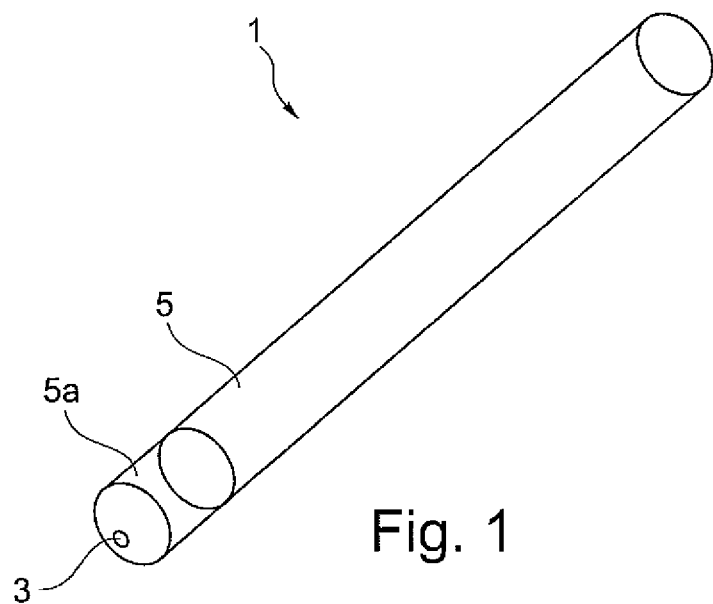
FIG. 1 shows a schematic depiction of a spray nozzle according to the invention.
Figure 2:
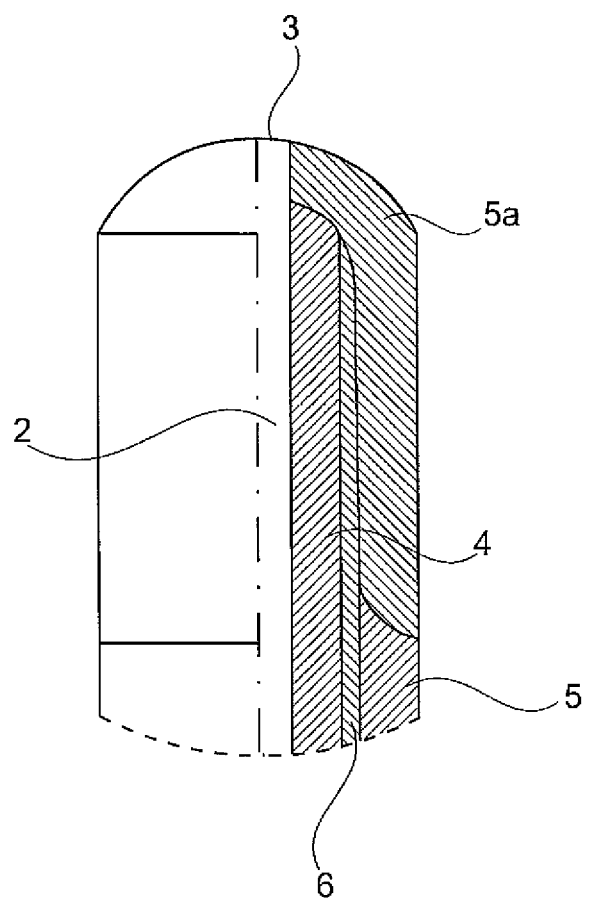
FIG. 2 shows a partial cross-sectional, detailed view of the embodiment depicted in FIG. 1.

Spray nozzle 1 shown in FIG. 1 is composed of a ceramic pin, in which a flow channel 2 extends, and that includes an opening 3 for a fluid to be atomized. FIG. 2 shows a partial cross-sectional view of the end, that includes opening 3, of the embodiment depicted in FIG. 1.

The ceramic pin has a ceramic inner conductor 4 and a ceramic outer conductor 5, between which a ceramic insulator 6 is disposed. An end section of outer conductor 5 on the end of the ceramic pin in which opening 3 is formed is designed as a ceramic heating conductor 5a which covers an end face of inner conductor 4. Various ceramic conductors 4, 5, 5a can be e.g. a ceramic based on molybdenum silicide and silicon nitride, wherein the electrical resistance can be adjusted to a desired value using the molybdenum silicide portion. Silicon nitride, for example, can be used for insulator 6.

In the embodiments depicted in FIGS. 1 and 2, flow channel 2 extends in the longitudinal direction continuously from one end of the ceramic pin to its other end. Flow channel 2 is enclosed by inner conductor 4.

Figure 3:
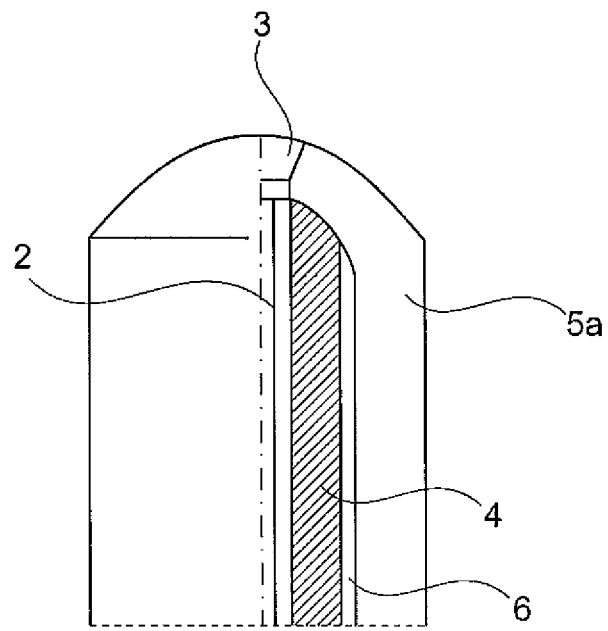
FIG. 3 shows a partial cross-sectional view of a further embodiment.

FIG. 3 shows a further embodiment which differs from the embodiment shown in FIG. 2 only by the geometry of opening 3. Opening 3 of the embodiment shown in FIG. 3 expands in the flow direction. A funnel shape or conical shape can be used to distribute atomized vapor or droplets in a particularly fine manner across a large solid angle. It is particularly advantageous when outlet opening 3 expands at an angle of 30° to 45°.

Figure 4:
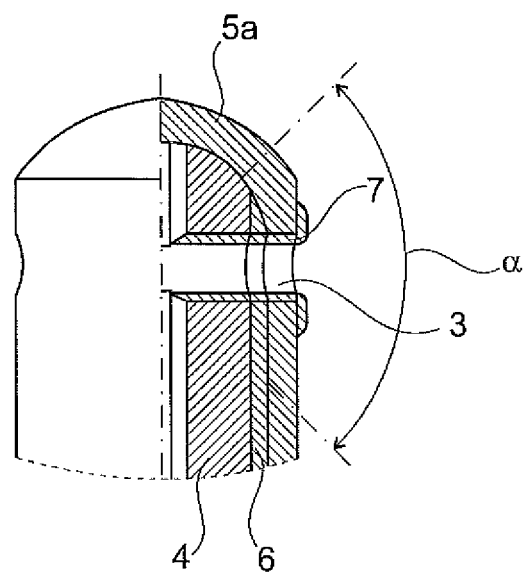
FIG. 4 shows a partial cross-sectional, detailed view of a further embodiment.

FIG. 4 shows a further embodiment that differs from the above-described embodiments in that openings 3 are realized as transverse bores. To form the liquid transport channel, a longitudinal bore extends from one end of the ceramic pin into the region enclosed by heating conductor 5a, but does not emerge from this end. The ceramic pin shown in FIG. 4 includes a plurality of openings 3 which are disposed in the circumferential direction in the section of outer conductor 5 designed as heating conductor 5a. Advantageously, this makes it possible to distribute atomized vapor or droplets over a wide area.

In contrast to the above-described embodiments, an opening is not provided in the end face of the ceramic pin. If necessary, an opening 3 in the end face can be combined with one or more openings 3 distributed in the circumferential direction. Although all transverse bores are disposed in a ring in FIG. 4, that is, they lie in a plane, transverse bores can also be advantageously disposed in a plurality of rings, that is, distributed in the longitudinal direction of the pin.

In the embodiment shown in FIG. 4, the transverse bores extend perpendicularly to the longitudinal direction of the ceramic pin. It is also possible, however, for the transverse bores to form a different angle with the longitudinal direction of the ceramic pin, the angle deviating e.g. by up to 45° from the right angle. An advantageous angular range is indicated in FIG. 4 by angle $\alpha$.

If the ceramic pin has an outlet opening 3 in its end face, as shown in FIGS. 2 and 3, and also has one or more openings in its jacket surface, then air can be drawn into transport channel 2 through lateral openings 3 during operation. This is particularly advantageous when the spray nozzle is used as a fuel injector since better ignition conditions can be obtained by mixing air and fuel. A vacuum in liquid transport channel 2, which can enable air to be drawn into openings 3 formed in the jacket surfaces, can be attained in particular via a suitable design of outlet opening 3 in the end face. An expanding outlet opening in the end face can bring about a nozzle effect in particular, which results in a vacuum being produced in flow channel 2.

The transverse bores preferably have a smaller diameter than that of the section of flow channel 2 enclosed by inner conductor 4. When used as an injection nozzle, a diameter of not more than 2 mm, e.g. 0.7 mm to 1.5 mm, is particularly advantageous. In this case, the transverse bores can have a diameter of e.g. 0.4 mm to 0.7 mm.

If spray nozzle 1 is used to vaporize fluids, e.g. if it is used as a fuel atomizer, there is always a risk that deposits will form in the region of openings 3. In the case of fuel atomization in particular, this can result in coking. The risk of deposits forming applies in particular to cylindrical or funnel-shaped inner surfaces of heating conductor 5a that bound an opening 3. This problem can be advantageously compensated for by covering outer conductor 5 or heating conductor 5a with a catalytically active coating 7, which catalytically supports the burn-off of soot deposits, in opening 3 or openings 3. Noble metals, e.g. platinum, have a catalytic effect and can therefore support the burn-off of soot deposits. Coating 7 can be manufactured e.g. on the basis of silicon oxide with an additive of one or more elements of the rare earths, and can be doped with noble metal.

A coating 7 of this type can be applied e.g. by spraying or as a powder coating, and can be burned in when the pin is sintered. Coating 7 can cover the inner surfaces of heating conductor 5a in opening 3, as well as a region of heating conductor 5a that encloses opening 3, or even entire heating conductor 5a.

Furthermore, the inner surface of flow channel 2 can be advantageously covered by a layer that protects inner conductor 4. A layer of this type can be manufactured during the coextrusion of a material, e.g. an oxide ceramic, in particular on the basis of silicon oxide, which forms a core of a green body, or it can be applied subsequently. A longitudinal bore and firing can be used to form a pin having a flow channel 2, in which case inner conductor 4 is covered with a protective layer.

REFERENCE NUMERALS

1 Spray nozzle
2 Row channel
3 Opening
4 Inner conductor
5 Outer conductor
5a Heating conductor
6 Insulator
7 Layer

What is claimed is:

1. An electrically heated spray nozzle the nozzle consisting essentially of:
    a single piece ceramic pin consisting essentially of a body with a flow channel with at least one opening for a fluid to be atomized, the ceramic pin including a ceramic inner conductor and a ceramic outer conductor, wherein inside the at least one opening of the ceramic outer conductor comprises a catalytically active coating; and
    a ceramic insulator disposed between the ceramic inner and outer conductor.

2. The spray nozzle according to claim 1, wherein an end section of the outer conductor is designed as a ceramic heating conductor.

3. The spray nozzle according to claim 2, wherein the heating conductor at one end of the ceramic pin covers an end face of the inner conductor.

4. The spray nozzle according to claim 2, wherein at least one opening extends through the heating conductor.

5. The spray nozzle according to claim 1, wherein at least one opening is disposed in a lateral surface of the ceramic pin.

6. The spray nozzle according to claim 1, wherein the flow channel extends outwardly in its longitudinal direction from one end of the ceramic pin.

7. The spray nozzle according to claim 1, wherein a plurality of openings is provided for a fluid to be atomized.

8. The spray nozzle according to claim 1, wherein the flow channel extends in the inner conductor.

9. The spray nozzle according to claim 1, wherein the at least one opening expands in the flow direction.

10. The spray nozzle according to claim 1 further comprising an active coating over the outer conductor.

11. An electrically heated spray nozzle, comprising:
    a ceramic inner conductor comprising a flow channel forming an opening for a fluid to be atomized;
    a ceramic outer conductor electrically coupled to the ceramic inner conductor;
    a ceramic insulator between the ceramic inner and outer conductor; and
    a catalytically active coating disposed within the flow channel of the ceramic inner conductor.

12. The spray nozzle of claim 11, wherein the catalytically active coating comprises a noble metal.

13. The spray nozzle of claim 11, wherein the catalytically active coating comprises platinum.

14. The spray nozzle of claim 11, wherein the catalytically active coating comprises a noble metal and a silicon oxide.

* * * * *